(12) United States Patent
Boland et al.

(10) Patent No.: US 8,107,625 B2
(45) Date of Patent: Jan. 31, 2012

(54) IP PHONE INTRUDER SECURITY MONITORING SYSTEM

(75) Inventors: Simon Daniel Boland, Pennant Hills (AU); Jonathan R. Yee-Hang Choy, Wahroonga (AU); Paul Thomas McNamara, Killarney Heights (AU)

(73) Assignee: Avaya Inc., Basking Ridge, NJ (US)

( * ) Notice: Subject to any disclaimer, the term of this patent is extended or adjusted under 35 U.S.C. 154(b) by 1339 days.

(21) Appl. No.: 11/096,334

(22) Filed: Mar. 31, 2005

(65) Prior Publication Data

US 2006/0219473 A1  Oct. 5, 2006

(51) Int. Cl.
*H04K 1/04* (2006.01)

(52) U.S. Cl. .......................................... 380/37
(58) Field of Classification Search ...................... 380/37
See application file for complete search history.

(56) References Cited

U.S. PATENT DOCUMENTS

| | | |
|---|---|---|
| 515,426 A | 2/1894 | French et al. |
| 4,035,760 A | 7/1977 | Asbury et al. |
| 4,074,069 A | 2/1978 | Tokura et al. |
| 4,275,385 A | 6/1981 | White |
| 4,446,454 A * | 5/1984 | Pyle .............................. 340/538 |
| 4,932,050 A | 6/1990 | Davidson et al. |
| 5,206,903 A | 4/1993 | Kohler et al. |
| 5,208,864 A | 5/1993 | Kaneda |
| 5,289,372 A | 2/1994 | Guthrie et al. |
| 5,315,434 A | 5/1994 | Mizuno |
| 5,461,390 A | 10/1995 | Hoshen |
| 5,515,426 A | 5/1996 | Yacenda et al. |
| 5,519,669 A | 5/1996 | Ross et al. |
| 5,543,778 A * | 8/1996 | Stouffer .................... 340/539.14 |
| 5,550,547 A | 8/1996 | Chan et al. |
| 5,555,376 A | 9/1996 | Theimer et al. |
| 5,558,013 A * | 9/1996 | Blackstone, Jr. ................ 100/35 |
| 5,627,375 A | 5/1997 | Hsieh |
| 5,680,450 A | 10/1997 | Dent |
| 5,689,548 A | 11/1997 | Maupin et al. |
| 5,742,666 A | 4/1998 | Alpert |
| 5,748,083 A * | 5/1998 | Rietkerk .................... 340/568.2 |
| 5,793,861 A | 8/1998 | Haigh |
| 5,805,999 A | 9/1998 | Inoue |
| 5,828,626 A | 10/1998 | Castile et al. |
| 5,828,747 A | 10/1998 | Fisher et al. |
| 5,884,262 A | 3/1999 | Wise et al. |

(Continued)

FOREIGN PATENT DOCUMENTS

CN  1141567  1/1997

(Continued)

OTHER PUBLICATIONS

Wu et al., Scidive: A Stateful and Cross Protocol Intrusion Detection Architecture for Voice-over-IP Environments, IEEE, 2004.*

(Continued)

*Primary Examiner* — David Garcia Cervetti
(74) *Attorney, Agent, or Firm* — Sheridan Ross P.C.

(57) ABSTRACT

A voice communications terminal is provided having a microphone to receive an audio stream and a voice activity detector to determine whether the audio stream comprises voice signals and when the audio stream comprises voice signals, notify a communications server and/or provide at least a portion of the audio stream to the communications server.

19 Claims, 5 Drawing Sheets

U.S. PATENT DOCUMENTS

| | | | |
|---|---|---|---|
| 5,905,659 A | 5/1999 | Rose | |
| 5,905,793 A | 5/1999 | Flockhart et al. | |
| 5,960,061 A | 9/1999 | Fahie et al. | |
| 5,982,873 A | 11/1999 | Flockhart et al. | |
| 6,046,683 A | 4/2000 | Pidwerbetsky et al. | |
| 6,067,017 A | 5/2000 | Stewart et al. | |
| 6,069,570 A | 5/2000 | Herring | |
| 6,076,121 A | 6/2000 | Levine | |
| 6,100,806 A | 8/2000 | Gaukel | |
| 6,104,288 A | 8/2000 | Hopkins | |
| 6,104,711 A | 8/2000 | Voit | |
| 6,154,525 A | 11/2000 | Formosa | |
| 6,173,053 B1 | 1/2001 | Bogart et al. | |
| 6,192,122 B1 | 2/2001 | Flockhart et al. | |
| 6,236,313 B1* | 5/2001 | Eskildsen et al. | 340/550 |
| 6,236,365 B1 | 5/2001 | LeBlanc et al. | |
| 6,249,227 B1 | 6/2001 | Brady et al. | |
| 6,265,963 B1 | 7/2001 | Wood, Jr. | |
| 6,275,794 B1 | 8/2001 | Benyassine et al. | |
| 6,282,574 B1 | 8/2001 | Voit | |
| 6,310,549 B1 | 10/2001 | Loftin et al. | |
| 6,359,880 B1 | 3/2002 | Curry et al. | |
| 6,362,778 B2 | 3/2002 | Neher | |
| 6,377,203 B1 | 4/2002 | Doany | |
| 6,400,265 B1* | 6/2002 | Saylor et al. | 340/531 |
| 6,449,358 B1 | 9/2002 | Anisimov et al. | |
| 6,453,291 B1 | 9/2002 | Ashley | |
| 6,456,964 B2 | 9/2002 | Manjunath et al. | |
| 6,463,607 B2 | 10/2002 | Hartmann | |
| 6,486,780 B1 | 11/2002 | Garber et al. | |
| 6,496,806 B1 | 12/2002 | Horwitz et al. | |
| 6,504,838 B1 | 1/2003 | Kwan | |
| 6,505,780 B1 | 1/2003 | Yassin et al. | |
| 6,542,436 B1 | 4/2003 | Myllyla | |
| 6,559,620 B2* | 5/2003 | Zhou et al. | 320/101 |
| 6,580,908 B1 | 6/2003 | Kroll et al. | |
| 6,600,443 B2 | 7/2003 | Landt | |
| 6,650,901 B1 | 11/2003 | Schuster et al. | |
| 6,658,091 B1 | 12/2003 | Naidoo et al. | |
| 6,661,340 B1* | 12/2003 | Saylor et al. | 340/517 |
| 6,678,357 B2 | 1/2004 | Stumer et al. | |
| 6,687,609 B2 | 2/2004 | Hsiao et al. | |
| 6,687,668 B2 | 2/2004 | Kim et al. | |
| 6,694,787 B1 | 2/2004 | Brown | |
| 6,705,522 B2 | 3/2004 | Gershman et al. | |
| 6,707,383 B2 | 3/2004 | Flaherty | |
| 6,707,903 B2 | 3/2004 | Burok et al. | |
| 6,724,891 B1* | 4/2004 | Huang et al. | 379/399.01 |
| 6,757,359 B2 | 6/2004 | Stumer et al. | |
| 6,763,231 B2 | 7/2004 | Takatori et al. | |
| 6,771,696 B1* | 8/2004 | Tuttle et al. | 375/222 |
| 6,778,084 B2 | 8/2004 | Chang et al. | |
| 6,778,096 B1 | 8/2004 | Ward et al. | |
| 6,804,329 B2 | 10/2004 | Geck et al. | |
| 6,825,767 B2 | 11/2004 | Humbard | |
| 6,892,052 B2 | 5/2005 | Kotola et al. | |
| 6,898,434 B2 | 5/2005 | Pradhan et al. | |
| 6,901,255 B2 | 5/2005 | Shostak | |
| 6,907,238 B2 | 6/2005 | Leung | |
| 6,965,313 B1* | 11/2005 | Saylor et al. | 340/539.18 |
| 6,972,682 B2* | 12/2005 | Lareau et al. | 340/568.1 |
| 6,983,124 B1 | 1/2006 | Bayley et al. | |
| 6,989,750 B2 | 1/2006 | Shanks et al. | |
| 6,990,328 B2 | 1/2006 | Crandall et al. | |
| 6,996,402 B2 | 2/2006 | Logan et al. | |
| 7,005,985 B1 | 2/2006 | Steeves | |
| 7,015,817 B2 | 3/2006 | Copley et al. | |
| 7,027,564 B2 | 4/2006 | James | |
| 7,030,731 B2 | 4/2006 | Lastinger et al. | |
| 7,030,761 B2 | 4/2006 | Bridgelall et al. | |
| 7,036,729 B2 | 5/2006 | Chung | |
| 7,040,532 B1 | 5/2006 | Taylor et al. | |
| 7,042,359 B2 | 5/2006 | Clucas | |
| 7,068,148 B2 | 6/2006 | Shanks et al. | |
| 7,084,740 B2* | 8/2006 | Bridgelall | 340/10.42 |
| 7,084,769 B2 | 8/2006 | Bauer et al. | |
| 7,088,242 B2 | 8/2006 | Aupperle et al. | |
| 7,113,090 B1* | 9/2006 | Saylor et al. | 340/539.18 |
| 7,123,149 B2 | 10/2006 | Nowak et al. | |
| 7,126,470 B2 | 10/2006 | Clift et al. | |
| 7,135,977 B2 | 11/2006 | Burg et al. | |
| 7,148,803 B2 | 12/2006 | Bandy | |
| 7,149,503 B2 | 12/2006 | Aarnio et al. | |
| 7,155,238 B2 | 12/2006 | Katz | |
| 7,183,907 B2* | 2/2007 | Simon et al. | 340/531 |
| 7,202,783 B2 | 4/2007 | Want et al. | |
| 7,209,771 B2 | 4/2007 | Twitchell, Jr. | |
| 7,212,829 B1 | 5/2007 | Lau et al. | |
| 7,228,429 B2* | 6/2007 | Monroe | 713/182 |
| 7,257,108 B2 | 8/2007 | Cheston et al. | |
| 7,262,690 B2* | 8/2007 | Heaton et al. | 340/500 |
| 7,266,347 B2 | 9/2007 | Gross | |
| 7,274,909 B2 | 9/2007 | Perttila et al. | |
| 7,280,833 B2* | 10/2007 | Suda et al. | 455/445 |
| 7,330,464 B2 | 2/2008 | Brouwer et al. | |
| 7,333,479 B2 | 2/2008 | Jalkanen et al. | |
| 7,373,109 B2 | 5/2008 | Pohja et al. | |
| 7,378,956 B2 | 5/2008 | Nam et al. | |
| 7,440,442 B2* | 10/2008 | Grabelsky et al. | 370/352 |
| 7,441,429 B1* | 10/2008 | Nucci et al. | 70/229 |
| 7,471,945 B2* | 12/2008 | Gabara et al. | 455/411 |
| 7,606,938 B2* | 10/2009 | Roese et al. | 709/242 |
| 7,684,559 B2 | 3/2010 | Hoshuyama et al. | |
| 7,739,402 B2* | 6/2010 | Roese et al. | 709/242 |
| 7,814,547 B2* | 10/2010 | Garg et al. | 726/23 |
| 2002/0005894 A1* | 1/2002 | Foodman et al. | 348/143 |
| 2002/0077826 A1* | 6/2002 | Hinde et al. | 704/270 |
| 2002/0082839 A1* | 6/2002 | Hinde et al. | 704/270.1 |
| 2002/0103636 A1 | 8/2002 | Tucker et al. | |
| 2002/0132647 A1 | 9/2002 | Chia et al. | |
| 2002/0165711 A1 | 11/2002 | Boland | |
| 2002/0173328 A1 | 11/2002 | Min | |
| 2003/0061344 A1* | 3/2003 | Monroe | 709/224 |
| 2003/0098789 A1* | 5/2003 | Murakami et al. | 340/506 |
| 2003/0104800 A1* | 6/2003 | Zak | 455/404 |
| 2003/0149526 A1* | 8/2003 | Zhou et al. | 701/213 |
| 2003/0185402 A1 | 10/2003 | Benesty et al. | |
| 2003/0221125 A1* | 11/2003 | Rolfe | 713/201 |
| 2003/0227540 A1* | 12/2003 | Monroe | 348/14.02 |
| 2004/0002305 A1 | 1/2004 | Byman-Kivivuori et al. | |
| 2004/0022394 A1 | 2/2004 | Michaelis | |
| 2004/0029557 A1 | 2/2004 | Pugliese | |
| 2004/0029558 A1 | 2/2004 | Liu | |
| 2004/0095238 A1* | 5/2004 | Beere | 340/531 |
| 2004/0134984 A1 | 7/2004 | Powell et al. | |
| 2004/0142678 A1 | 7/2004 | Krasner | |
| 2004/0186768 A1 | 9/2004 | Wakim et al. | |
| 2004/0203352 A1 | 10/2004 | Hall et al. | |
| 2004/0203944 A1 | 10/2004 | Huomo et al. | |
| 2004/0215750 A1* | 10/2004 | Stilp | 709/220 |
| 2005/0007999 A1 | 1/2005 | Becker et al. | |
| 2005/0048988 A1 | 3/2005 | Gentle | |
| 2005/0083911 A1 | 4/2005 | Grabelsky et al. | |
| 2005/0110612 A1 | 5/2005 | Carrender | |
| 2005/0128295 A1* | 6/2005 | Addy | 348/153 |
| 2005/0207589 A1 | 9/2005 | Biegelsen | |
| 2006/0075497 A1* | 4/2006 | Garg et al. | 726/23 |
| 2006/0075498 A1* | 4/2006 | Yeom | 726/23 |
| 2006/0094405 A1 | 5/2006 | Dupont | |
| 2006/0120517 A1 | 6/2006 | Moon et al. | |
| 2006/0121916 A1 | 6/2006 | Aborn et al. | |
| 2006/0177071 A1* | 8/2006 | Eskildsen | 381/56 |
| 2006/0181401 A1* | 8/2006 | Martin | 340/506 |
| 2008/0155094 A1 | 6/2008 | Roese et al. | 709/224 |
| 2008/0313737 A1* | 12/2008 | Garg et al. | 726/23 |
| 2009/0070875 A1* | 3/2009 | Garg et al. | 726/23 |
| 2009/0274143 A1* | 11/2009 | Garg et al. | 370/352 |
| 2009/0274144 A1* | 11/2009 | Garg et al. | 370/352 |
| 2010/0296510 A1* | 11/2010 | Zellner et al. | 370/352 |

FOREIGN PATENT DOCUMENTS

| | | |
|---|---|---|
| EP | 0899673 | 3/1999 |
| EP | 0998108 | 5/2000 |
| EP | 1091307 | 4/2001 |
| EP | 1150236 | 10/2001 |
| EP | 1316905 | 6/2003 |
| EP | 1324255 | 7/2003 |

| | | |
|---|---|---|
| GB | 2298106 | 8/1996 |
| JP | H08-191311 | 7/1996 |
| JP | 2000-99862 | 4/2000 |
| JP | 2001-223822 | 8/2001 |
| JP | 2002-250768 | 9/2002 |
| JP | 2003-223690 | 8/2003 |
| JP | 2003-234848 | 8/2003 |
| JP | 2003234848 * | 8/2003 |
| JP | 2004013789 | 1/2004 |
| JP | 2004-102370 | 4/2004 |
| JP | 2004-120677 | 4/2004 |
| JP | 2004-215047 | 7/2004 |
| JP | 2004-242274 | 8/2004 |
| JP | 2004-318283 | 11/2004 |
| WO | 01/95642 | 12/2001 |
| WO | WO 01/94967 | 12/2001 |
| WO | WO 02/44865 | 6/2002 |
| WO | 2004/092999 | 10/2004 |
| WO | WO 2005001669 | 1/2005 |

OTHER PUBLICATIONS

U.S. Appl. No. 10/932,507, Fegan.
U.S. Appl. No. 11/040,352, Klatsmanyi et al.
Active Campus Tutorial by David Casteron dated Oct. 11, 2003, downloaded from http://activecampus-dev.ucsd.edu/ntutorial/main.htm on Apr. 12, 2005.
Avaya "Administrator's Guide for Avaya Communication Manager: vols. 1, 2, and 3," 555-533-506, Issue 7 (Nov. 2003), pp. 121, 129, 886, 889, 1169, 1193, 1555.
Cisco, Cisco Emergency Responder, printed Feb. 11, 2003, avaiable at http://www.cisco.com/warp/public/cc/pd/unco/cer/, 2 pages.
Comments of Nortel Networks, Before the Federal Communications Commission, May 28, 2004, pp. 1-22 with Appendices 1-4.
Location Based Services downloaded from http://www.ericsson.com/telecomreport/article.asp?aid=34&tid=201&ma=1&msa=3; last published Oct. 3, 2002.
Mobile in a Minute downloaded from www.mobilein.com/location_based_services.htm; copyright 2001-2004.
Project Mayhem by Phillip Dressen, James Gillespie, Benjamin Hoyt and Simone Nicolo, downloaded from http://www.cs.colorado.edu/upgrad/seniorproject/projects/projectmahhem.html; 2005.
Schulzrinne, "Providing Emergency Call Services for SIP-based Internet Telephony", Available at: http://www.iptel.org/info/playersietflocation/draft-schulzrinne-sip-911- -00.txt, Jul. 2000, pp. 1-14.
U.S. Appl. No. 10/911,090, filed Aug. 3, 2004, Fegan et al.
U.S. Appl. No. 10/795,119, filed Mar. 5, 2004, Moon et al.
U.S. Appl. No. 10/810,459, filed Mar. 27, 2004, Orbach.
"RFID Journal—Frequently Asked Questions," RFID Journal (2004, available at http://www.rfidjournal.com/article/articleview/207, 7 pages.
"RFID," SearchNetworking.com, available at http://searchnetworking.techtarget.com/sDefinition/0,,sid7_gci805987,00.html (updated Jan. 16, 2004), 2 pages.
Article entitled, "Global Business—The See-It-All Chip," Time Online Edition (Sep. 22, 2003), available at http://www.time.com/time/globalbusiness/article/0,9171,1101030922-485764-3,00.html, 3 pages.
Kendra Mayfield,"Radio ID Tags: Beyond Bar Codes," Wired News (May 20, 2002), available at http://www.wired.com/news/technology/0,1282,52343,00.html, 3 pages.
Article entitled, "An Internet of Things: Is RFID the Mark of Satan . . . ," Newsweek (Jun. 10, 2004), available at http://msnbc.msn.com/id/3068871, 4 pages.
"RFID," from Wikipedia, the free encyclopedia (Updated May 31, 2004), available at http://en.wikipedia.ord/wiki/RFID, 3 pages.
Greg Griffin, "Bar Code Meets Its Match: Radio-Frequency ID Offers More Data," The Denver Post, (Jun. 3, 2004), pp. 1C, 8C.
Data Sheet entitled, "Cisco Emergency Responder Version 1.1," Cisco Systems Inc. (Oct. 2001), pp. 1-5.
"Solving the Challenges of E911 Service with Avaya IP Telephony Networks," Avaya White Paper, Issue 1.1 (Nov. 2001), pp. 1-7.
Website entitled "Cisco Emergency Responder," Cisco Systems, Inc. (1992-2002), available at http://www.cisco.com/warp/public/cc/pd/unco/cer/, 2 pages.
"TIA Telecommunications Systems Bulletin: Telecommunications—IP Telephony Infrastructures—IP Telephony Support for Emergency Calling Service," Telecommunications Industry Association, TSB-146 (Mar. 2003), pp. 1-30.
RedSky Technologies, Inc. website entitled, "Welcome to RedSky's E-911 Business Watch," E-911 Business Watch, Issue 4 (Oct. 21, 2003), 5 pages.
Applied Generics Technical Report, "NERO24 Mobile Location System (GSM Edition)," Version 1.0 (2004), pp. 1-27.
Khaled El-Maleh et al., "Comparison of Voice Activity Detection Algorithms for Wireless Personal Communications Systems," McGill University, Department of Electrical Engineering (1997), pp. 1-26.
U.S. Appl. No. 11/369,692, filed Mar. 6, 2006, Sadot et al.
Lee, "Analysis: Verizon's VoIP patents drop dime on need for reform", available at http://arstechnica.com/news.ars/post/20070425-analysis-verizons-voip-patents-drop-dime-on-need-for-reform.html, pp. 1-3, Apr. 25, 2007.
"Providing E911 services for Nortel VoIP", available at http://www.bytesnwords.com/clients/qovia/website/products/pr_overview_nortel.htm, Copyright 2004-2006 (printed Sep. 22, 2008), 1 page.
Official Action for Canadian Patent Application No. 2,526,755, mailed Jun. 13, 2006.
Official Action for Canadian Patent Application No. 2,526,755, mailed Apr. 2, 2009.
Nikos Doukas et al., "Voice Activity Detection Using Source Separation Techniques", Signal Processing Section, Dept. of Electrical Engineering, Imperial College, UK, four (4) pages; 1997.
"RFID.ORG" AIM, Inc., available at http://www.aimglobal.org/technologies/rfid, 3 pages, printed Jun. 2, 2004.
Katherine Albrecht, "Tracking Everything, Everywhere," CASPIAN, Stop RFID.com website, available at http://www.stoprfid.org/rfid_overview.htm, (Excerpted from: Albrecht, Katherine. "Supermarket Cards: The Tip of the Retail Surveillance Iceberg." Denver University Law Review, Summer 2002, vol. 79, Issue 4, pp. 534-539 and 558-565) 7 pages, printed Jun. 2, 2004.
"Perimeter Security Sensor Technologies Handbook," available at http://www.nlectc.org/perimetr/full2.htm, 104 pages, printed Feb. 2, 2005.
Examiner's Office Letter (including translation) for Japanese Patent Application No. 2006-096301, mailed Jul. 1, 2009.
European Search Report and Opinion for European Patent Application No. 05257211.2, mailed Oct. 15, 2009.
Official Action for Canadian Patent Application No. 2,526,755, dated Apr. 23, 2010.
Examiner's Office Letter (including English translation) for Japanese Patent Application No. 2006-096301, mailed Jul. 26, 2010.
Official Action for European Patent Application No. 05257211.2, dated Jun. 18, 2010.
Salami et al., "Speech Coding," Chapter 3 in Mobile Radio Communications, R. Steele (ed.), Pentech Press, 1992, pp. 244-253.
Tucker, "Voice activity detection using a periodicity measure," IEE Proceedings-1, Aug. 1992, vol. 139(4), pp. 377-380.
Rangoussi et al., "Higher Order Statistics Based Gaussianity Test Applied to On-Line Speech Procesing [sic]," In Proc. of the IEEE Asilomar Conf., 1995, pp. 303-307.
Rabiner et al., "Digital Processing of Speech Signals," Prentice-Hall, Englewood Cliffs, NJ, 1978, pp. 149-150.
"ITU-T Recommendation G.729, Annex B: A Silence compression scheme for G.729 optimized for terminals conforming to Recommendation V.70," International Telecommunications Union, Nov. 1996, pp. 1-16.
Srinivasan et al., "Voice Activity Detection for Cellular Networks," In Proc. IEEE Workshop on Speech Coding for Telecommunications, Oct. 1993, pp. 85-86.
Freeman et al., "The Voice Activity Detector for the Pan-European Digital Cellular Mobile Telephone Service," British Telecom Research Laboratories, IEEE, May 1989, CH2673-2/89/0000-0369, pp. 369-372.

Official Action for Canada Patent Application No. 2,526,755, dated Dec. 14, 2010 3 pages.
Official Action with English translation for Japan Patent Application No. 2006-096301, mailed Aug. 1, 2011 4 pages.

Notice of Allowance for Canada Patent Application No. 2,526,755, dated Aug. 3, 2011 1 page.

* cited by examiner

IP PHONE INTRUDER SECURITY MONITORING SYSTEM

CROSS REFERENCE TO RELATED APPLICATION

Cross reference is made to U.S. patent application Ser. No. 10/911,090, filed Aug. 3, 2004, entitled "INTEGRATED REAL-TIME AUTOMATED LOCATION POSITIONING ASSET MANAGEMENT SYSTEM", which is incorporated herein by this reference.

FIELD

The invention relates generally to security systems and particularly to security systems using a communications network.

BACKGROUND

Property crime continues to be a major cost to economies worldwide. To combat crime, most businesses use security systems that detect, deter, document, deny, and delay intrusions into a protected area or facility. Security systems are particularly important in applications where government and/or private security personnel do not patrol or are otherwise not responsible for the area or facility.

A typical security system is an integrated system that typically includes a number of intrusion detection sensors, an alarm processor, an intrusion/alarm monitoring station, and a communications structure or network that connects these elements and connects the system to the reaction elements. In interior intrusion systems, a broad variety of sensor types is available for use. Examples include window sensors, glass break sensors, door sensors, wall sensors, volumetric sensors, beam sensors, video sensors, noise level sensors, and motion sensors.

A security system, whether providing security against exterior or interior intrusions, is commonly evaluated based on three performance characteristics, namely the probability of detection (PD), false alarm rate (FAR), and vulnerability to defeat. The PD provides an indication of sensor performance in detecting movement within a zone covered by the sensor. The FAR indicates the expected rate of occurrence of alarms which are not attributable to intrusion activity. Vulnerability to defeat indicates the likelihood that an intruder can bypass a sensor/security system without detection. A major goal of the security planner is to field an integrated detection system that exhibits a low FAR and a high PD and is not susceptible to defeat.

Although security systems are available that meet these objectives, they can be quite costly. The various components are expensive to install and commonly sold at a high cost. Although it is possible to use an existing installation such as a power line to transmit video for security monitoring, a substantial investment is still required for the security system. Ongoing charges are typically also assessed for monitoring and maintaining the security system components. Moreover, the components can be relatively obtrusive and unsightly and are generally used only for security activities.

SUMMARY

These and other needs are addressed by the various embodiments and configurations of the present invention. The present invention is directed to an audio monitoring system for detecting the presence of a person that is particularly useful in an enterprise network.

In one embodiment, the present invention is directed to a voice communications terminal that:

(a) receives an audio stream through a microphone;

(b) determines whether the audio stream comprises nonbackground signals; and (c) when the audio stream includes nonbackground signals, notifies a communications server and/or provides all or a portion of the audio stream to the communications server. As used herein, "nonbackground" signals refer to audio signals that are unusual relative to the other audio signals received over a determined time interval and/or signals having a signal strength greater than a selected decibel level. Nonbackground audio signals could include voice signals, doors opening/closing, foot falls, a loud sudden noise such as an item being knocked over, voices, and the like. Some non-recurring types of audio signals that are not indicative of an intruder, such as telephone rings, can be excluded from nonbackground signal classification by known techniques, such as by recognizing the audio signal frequency range and/or distribution, the switch noting that a communication device is ringing, and the like. In contrast, "background" audio signals refer to signals that occur regularly during a selected time interval, are not indicative of an intruder, or, though irregular or non-recurring, have a signal strength less than a selected decibel level. The present invention can provide an integrated security monitoring system through the use of voice communications terminals' microphones in a distributed network. As a result of the convergence of IP telephony, the present invention can provide a highly effective security system having a low FAR and a high PD and a low susceptibility to defeat.

In another embodiment, a voice communications terminal includes:

a microphone to receive an audio stream;

a corresponding internal extension in a premises serviced by a contact processing server, the server directing incoming calls to and receiving outgoing calls from the internal extension; and a voice activity detector to (a) determine that the audio stream comprises nonbackground signals and (b) in response to determining that the audio stream comprises nonbackground signals, at least one of (i) notify contact processing server and (ii) provide at least a portion of the audio stream to the contact processing server.

In another embodiment, a voice communications terminal includes:

means for receiving an audio stream;

a corresponding internal extension in a premises serviced by a communications server, the server directing incoming calls to and receiving outgoing calls from the internal extension; and voice activity detector means for (a) determining that the audio stream comprises voice signals and (b) in response to determining that the audio stream comprises voice signals, at least one of (i) notifying the communications server and (ii) providing at least a portion of the audio stream to the communications server.

In one configuration in the determining function, the voice activity detector means performs voice activity detection on the audio stream by pre-processing the audio stream to form a pre-processed audio stream; extracting features from a selected segment of the pre-processed audio stream, the extracted features including one or more of energy, zero crossing, a frequency-domain shape of the pre-processed audio stream, a periodicity measure, and/or a statistic of speech and background noise; and comparing extracted features with selected thresholds to determine whether non-background noise is present or absent from the selected segment of the pre-processed audio stream. The communications server includes a call controller and alarm agent means for receiving the notification from the voice communications terminal and transmitting an alarm notification to a security provider.

In one configuration, the terminal can include one or more other components including:

audio sending means for sending at least a portion of the audio stream to the communications server;

audio broadcasting means for receiving at least one of a text and audio message from the communications server and broadcasting the at least one of a text and audio message through a speaker; and authentication means for authenticating a command from the communications server.

In one configuration, the voice communications terminal uses audio sensing to determine the presence of a person, such as an intruder. The microphone uses voice activity detection techniques to detect any sound made in the surrounding environment. Because a typical enterprise network includes a large number of spatially distributed terminals, the use of neighboring terminals can reduce the impact of false detection from outside noises such as noise from plane engines and emergency sirens and thereby reduce not only false alarms, but also the likelihood that an intruder can evade detection. The identity of the terminal sending a notification can be converted into a corresponding physical location to provide useful information about the potential position of an intruder. Voice communications terminals are an essential part of an enterprise network and therefore are much less obtrusive and unsightly than conventional security cameras and sensor devices. Voice communications terminals can therefore be much harder for an intruder to avoid.

The present invention can also have significant positive impact in emergency situations. By way of example, in a fire emergency the system can be activated and voice activity detection used to report the location of people who may be screaming out for help. The person could be located by locating the phone that is receiving the strongest audio signals corresponding to their cries for assistance (i.e., has the greatest likelihood of voice detection of the person). This, of course, requires the terminal to discern background noise from voice signals and determine the strength (decibels) of the isolated voice signals.

The present invention can be used in lieu of or in conjunction with existing security monitoring equipment. When an intruder is detected, closed circuit television cameras in the location of the reporting voice terminal can be viewed selectively by security monitoring staff. If the reporting voice communications terminal is a video endpoint, the video camera in the device could be enabled to report the image that the voice communications terminal's camera records. As the terminals are connected to the network, they can report back to existing security management software or to network monitoring tools.

Since voice communications terminals are not in use when the security module is enabled, the entire processing power of the terminal would be available for processing the recorded signals and removing noise, thus providing a more accurate voice detection. In this manner, voice communications terminals can provide services in addition to normal or customary voice communications.

The terminal's speaker could also be used in conjunction with microphone detection, whereby a security monitoring officer could speak or an automated message could be played to the intruder and inform them that they are being monitored.

The present invention can provide security monitoring through a cost-effective medium. The installed base for IP endpoints is typically a large and unavoidable cost in an office scenario. The possibility of using IP endpoints in a security system, especially by small to medium businesses, can be a value-added feature for IP endpoints themselves. Moreover, it can be cost-effective security feature compared with dedicated security systems. Security is a major cost to a business and the present invention can reduce substantially the cost of installation of a security system.

These and other advantages will be apparent from the disclosure of the invention(s) contained herein.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having a private branch exchange (PBX) or other similar contact processing switch or server, the invention is not limited to use with any particular type of communication system switch or server or configuration of system elements. Those skilled in the art will recognize that the disclosed techniques may be used in any communication application in which it is desirable to provide improved contact processing directed from an external network into a PBX or other communication system switch or server.

Figure 1:
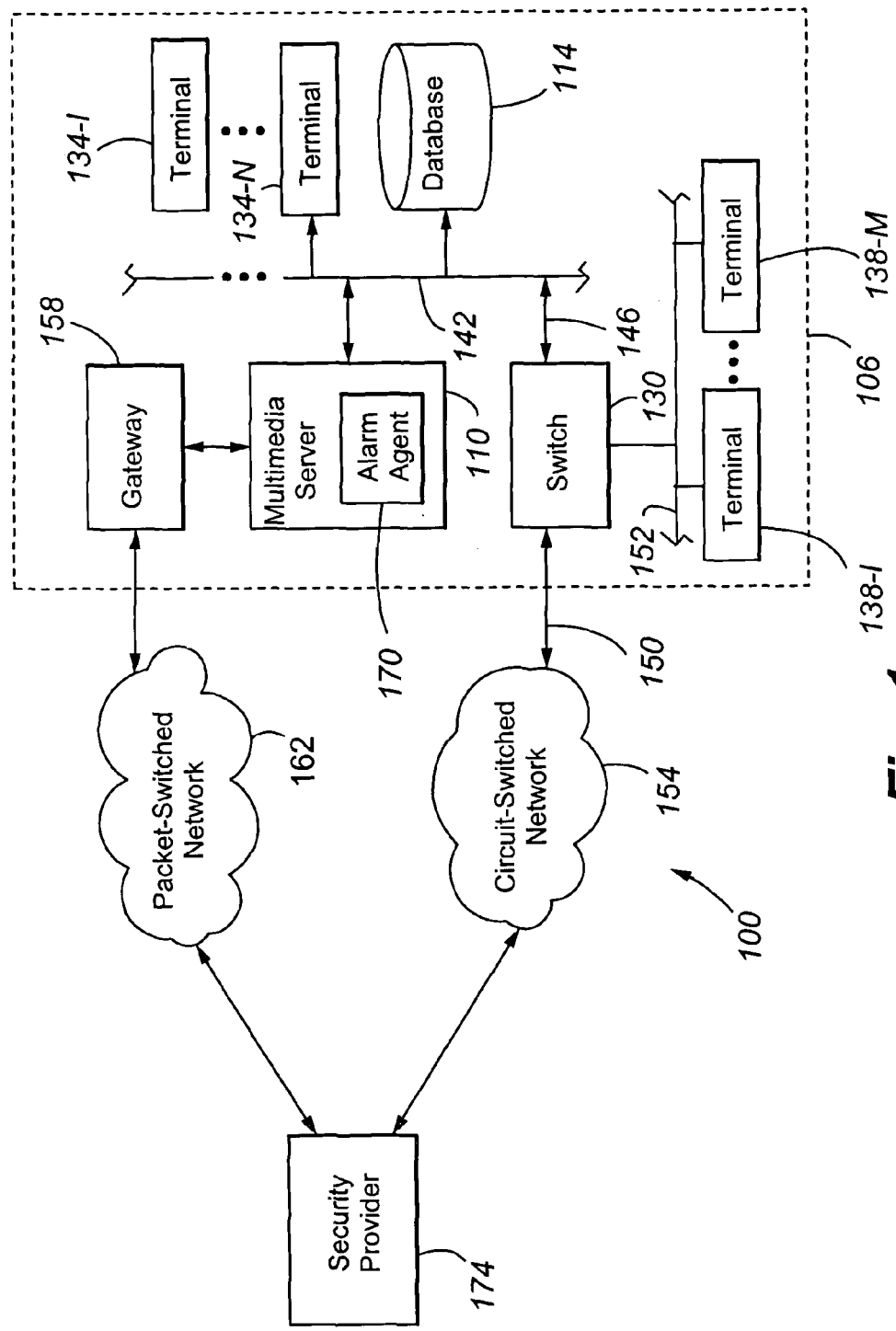
FIG. 1 is an enterprise network according to an embodiment of the present invention.

FIG. 1 shows an exemplary communication system 100 in which the invention is implemented. The system 100 includes a multi-media server 110 that serves a premises 106, including circuit-switched second terminals 138-1, . . . 138-M that are subscribers to the server 102, a Local Area Network 142 that serves a number of packet-switched first terminals 134-1, 134-2, . . . 134-N that are also subscribers to the server 110, a set of data stores or databases 114 containing subscriber-related information, and a switch 130. Each of the second terminals 138-1, . . . 138M and first terminals 134-1, 134-2, . . . 134N has a corresponding internal extension.

These extensions are referred to herein as "internal" in that they are extensions within the premises 106 that are directly serviced by the server. More particularly, these extensions correspond to conventional terminal endpoints serviced by the server, and the server can direct incoming calls to and receive outgoing calls from these extensions in a conventional manner. The server can be connected via optional communication line 146 to the switch 130. The switch 130 is connected via a plurality of trunks 150 to the circuit-switched network 154 (e.g., the Public Switch Telecommunication Network or PSTN 154) and via link(s) 152 to the second terminals 138-1 to M. A gateway 158 is positioned between the server 110 and the packet-switched network 162 to process communications passing between the server 110 and the network 162.

The media server 110 can be any converged architecture for directing circuit-switched and/or packet-switched customer contacts to one or more terminals. Typically, the server is a stored-program-controlled system that conventionally includes interfaces to external communication links, a communications switching fabric, service circuits (e.g., tone detectors and generators, etc.), memory for storing control programs and data, and a processor (i.e., a computer) for executing the stored control programs to control the interfaces and the fabric and to provide automatic contact-distribution functionality. Features provided by the media server 110 typically include not only telephony features and intelligent contact routing but also localization, collaboration, mobility, messaging, system management, attendant features, networking, and application programming interfaces. The server 110 typically includes a network interface card (not shown) to provide services to the serviced terminals. Illustratively, the media server can be a modified form of the subscriber-premises equipment disclosed in U.S. Pat. No. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Avaya Inc.'s IP600™ LAN-based ACD system, or an S8100™, S8300™, S8500™, S8700™, or S8710™ media server running a modified version of Avaya Inc.'s Communication Manager™ voice-application software with call processing capabilities and contact center functions. Other types of known switches and servers are well known in the art and therefore not described in detail herein.

The first terminals 134-1, . . . 134-N are packet-switched and can include, for example, wire or wireless IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second terminals 138-1, . . . 138-M are circuit-switched. The terminals 138-1, . . . 138-M can be any circuit-switched communication device including, for example, wired and wireless digital or analog telephones, PDAs, H.320 video phones and conferencing units, and voice messaging and response units.

It should be noted that the invention does not require any particular type of information transport medium between switch or server and first and second terminals, i.e., the invention may be implemented with any desired type of transport medium as well as combinations of different types of transport media.

The packet-switched network 162 can be any wired and/or wireless data and/or distributed processing network, such as the Internet. The network 162 typically includes proxies (not shown), registrars (not shown), and routers (not shown) for managing packet flows.

In a preferred configuration, the server 110, network 162, and first terminals 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user terminals, and other elements as shown in FIG. 1 is for purposes of illustration only and should not be construed as limiting the invention to any particular arrangement of elements.

The gateways 158 is an electronic signal repeater and protocol converter that provides a telephone exchange service, supporting the connection of various types of telephones (such as Digital Control Processor or DCP phones, analog phones, and IP telephones) and outside packet-switched and/or circuit-switched telephone lines (such as analog trunks, ISDN lines, E1/T1 voice trunks, and WAN routing IP trunks). Telephone lines are connected to the gateway via ports and media modules on the chassis, with different media modules providing access ports for different types of telephones and lines. Voice and signaling data between packet-switched and circuit-switched protocols is effected by the media modules converting the voice path to a TDM bus inside the gateway. An engine, such as a Voice Over IP or VoIP engine, converts the voice path from the TDM bus to a compressed or uncompressed and packetized VoIP, typically on an Ethernet connection. Each gateway commonly includes a number of port and trunk circuit packs for performing selected telecommunications functions, such as (DTMF) tone detection, tone generation, playing audio (music and/or voice) announcements, traffic shaping, and call admission control, a media processor, and one or more IP server interfaces. The gateway may perform policy-based routing, which uses a policy list structure to implement a routing scheme based on traffic source, destination, type, and other characteristics. Common applications include separate routing for voice and data traffic, routing traffic originating from different sets of users through different Internet connections (or Internet Service Providers or ISP's), and defining backup routes for defined classes of traffic. Examples of gateways include Avaya Inc.'s SCC1™, MCC1™, CMC™, G350™, G600™, G650™, and G700™.

The LAN 142 is a conventional local area network that is wireless and/or uses wires and/or optical fiber as a common carrier medium. It may employ any suitable protocol, with the Ethernet Protocol being preferred.

Figure 2:
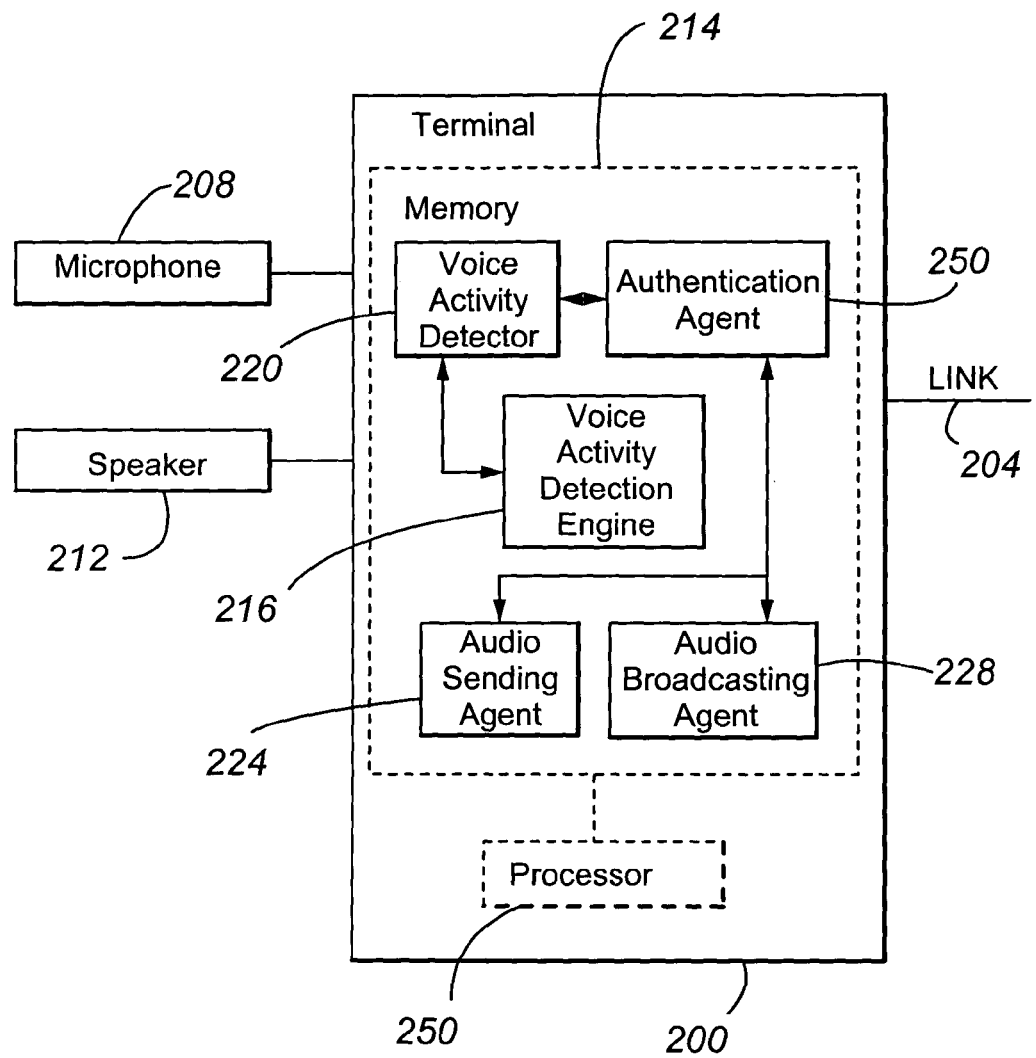
FIG. 2 is a block diagram of a terminal according to an embodiment of the present invention.

A typical subscriber terminal 134 or 138 is depicted in FIG. 2. The terminal 200 is connected to a communication link 204. The terminal and link may be wired or wireless. Illustratively, the terminal is a voice-enabled personal computer and VoIP link is part of the local area network 142. The terminal 200 is equipped with a microphone 208 and speaker 212. In one configuration, the terminal receives an analog input signal from the microphone 208, samples, digitizes, and packetizes it, and transmits the packets on the LAN 142. The process is reversed for input from the LAN 142 to speaker 212.

The terminal includes, in memory 214, a number of computational modules that are performed by the processor 250 and collectively enable the terminal to act as a sensor of a security system. A voice activity detection engine 216 detects a nonbackground audio signal in a signal that has unknown characteristics. A voice activity detector 220 receives output from the voice activity detection engine 216, determines whether a nonbackground audio signal has been detected by the output, and, if so, notifies an alarm agent 170 in the multimedia server 110. An audio sending agent 224, under the control of the detector 220, sends an audio stream received via the microphone 208 to the server 110 for storage in a database 114. As will be appreciated, a number of variations are possible for storing audio samples in the database. They are: (a) to store the raw PCM samples themselves, and (b) to store a compressed version of the samples obtained after encoding the background and nonbackground audio samples with a codec/compression engine designed to reduce the storage needs. In either case, feature extraction methods can be used afterwards for law enforcement purposes such as being able to do speaker recognition (which is the detection of a person by their voice). The second case (b) would involve performing speaker recognition before compression and storage to prevent the compression from interfering with the speaker recognition stage.

An audio broadcasting agent 228 opens a unidirectional channel with the server 110 to broadcast audio signals to the potential intruder. In the event that the potential intruder voices or otherwise inputs an identity, the microphone 208 and audio sending agent 224 forward the voice signals to the server 110. An intruder alarm notification and/or audio stream may be provided to security personnel, such as security provider 174 for appropriate action.

Voice activity detection by the engine 216 may be performed by any suitable technique, including those disclosed in copending U.S. patent application Ser. No. 09/813,525, filed Mar. 21, 2001, to Boland, entitled "VOICE-ACTIVITY DETECTION USING ENERGY RATIOS AND PERIODICITY", which is incorporated herein by this reference. As will be appreciated, voice activity detection commonly follows a paradigm of pre-processing, feature-extraction, thresholds-comparison, and output-decision stages. The preprocessing stage places the input audio signal into a form that better facilitates feature extraction. The feature-extraction stage differs widely from algorithm to algorithm but commonly-used features include energy, either full-band, multiband, low-pass, or high-pass, zero crossings, the frequency-domain shape of the signal, periodicity measures, and/or statistics of the speech and background noise. The thresholds comparison stage then uses the selected features and various thresholds of their values to determine if speech is present in or absent from the input audio signal. This usually involves use of some "hold-over" algorithm or "on"-time minimum threshold, to ensure that detection of either presence of speech lasts for at least a minimum period of time and does not oscillate on-and-off. Some voice activity detection systems measure the background noise a-priori to set the thresholds for later comparisons. Other systems are automatic and do not require a-priori measurement of background noise.

As will be appreciated, the present invention detects not only voice but also other audible signals indicative of an intruder's presence. Such audible signals are typically in the form of noise that is not ambient background noise, e.g., someone banging a table or chair. While it is true that most Voice Activity Detection or VAD systems will detect such noise, they can have varying levels of accuracy of detecting voice. One way to combat this would be to have a configurable VAD, whereby the central security monitoring system could control the level of noise that was detected as not background noise. A complementary security monitoring device such as a CCTV (camera) could then be observed to see if it was a true alarm. In this case, the VAD could be set to a very sensitive level, but in a case when no camera was present, false alarms from such a sensitive setting would be expensive. Essentially, the more sensitive the VAD is set, the more frequently a false detection would occur.

Figure 3:
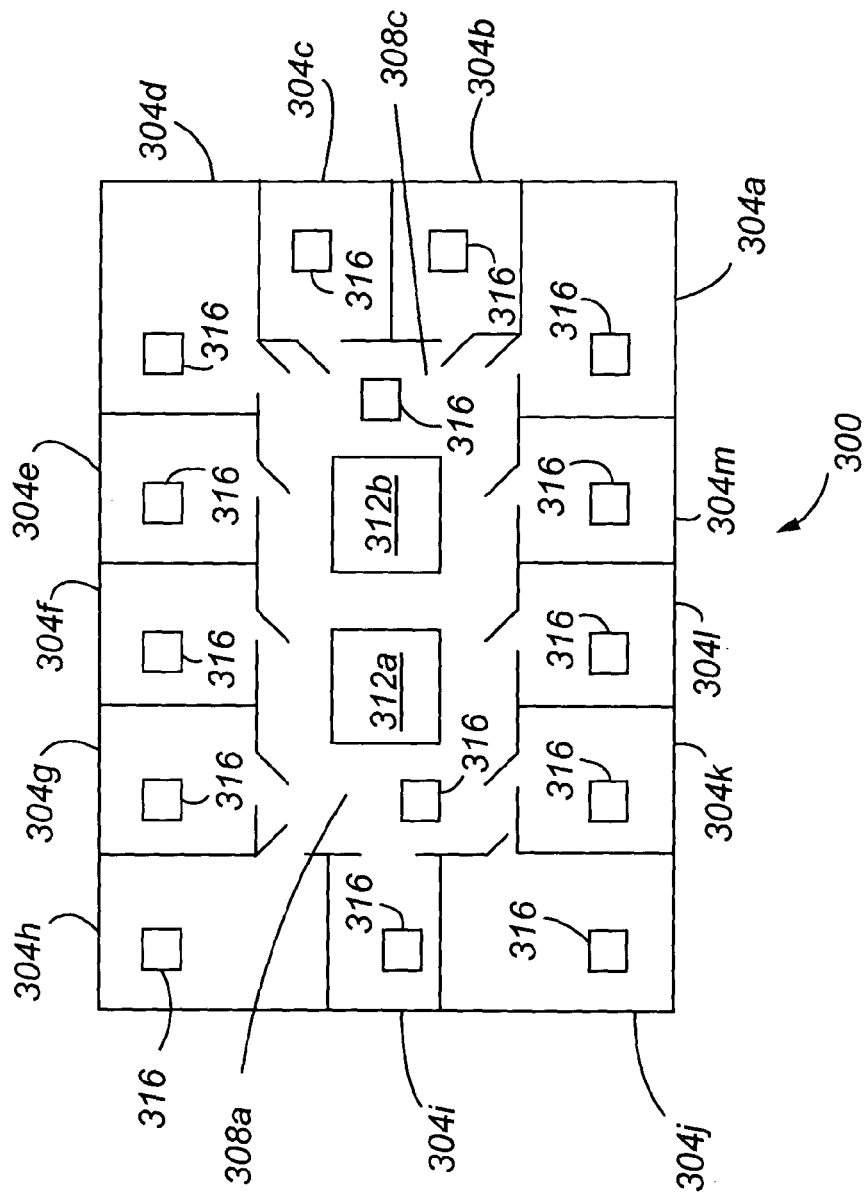
FIG. 3 is a plan view of a building having a number of terminals configured as set forth in FIG. 2.

An operational example of the security system of the subject invention will be described with reference to FIG. 3. FIG. 3 depicts a building 300 having a plurality of offices 304a-m, reception areas 308a,b and elevators 312a,b. Each office and reception area includes voice communications a terminal 316. As shown by the arcs 320a-d for the terminals in offices 304i-k and reception area 308a, each terminal has an effective range to receive and detect voice signals accurately. The range depends, of course, on the relative volume level of the voice signal and any nonvoice background noise. If intruders enter through one of the elevators 312a and converse with one another, the voice activity detection engine 216 in the terminal 316 in reception area 308a will detect the voice signals and report the presence of voice signals to the voice activity detector 220. The detector 220 will generate and forward a notification to the alarm agent 170 in the server 110. The alarm agent 170 will, in turn, send an alarm notification to the security provider via either the packet-switched network 162 or circuit-switched network 154. The security provider 174 will dispatch appropriate personnel and/or transmit a command to the alarm agent 110 to take one or more appropriate actions, including recording all voice signals detected from any of the terminals for a determined period of time, broadcasting from the voice detecting terminal a voice message to the intruder, and/or sounding an audio alarm through out the building floor on which intruders are detected.

The voice detection ranges of the various terminals can be used to locate the intruders at any point in time. In the example, as the intruders continue to converse with one another and walk to office 304i, then to office 304j, and finally office 304k, the voice activity detection system of each corresponding terminal will sequentially detect the intruders' voice signals and send appropriate notifications to the switch 110. This information may in turn be forwarded to the security provider 174. Where more than one terminal detects the voice signals, the physical location of the intruders can be identified more accurately, such as using overlapping of microphone ranges and/or triangulation or other location techniques.

Other techniques can be used to facilitate object location with a high degree of precision. Other terminal location techniques are discussed in copending U.S. patent application Ser. Nos. 10/911,090, filed Aug. 3, 2004, entitled "Integrated Real-Time Automated Location Positioning Asset Management System"; Ser. No. 10/795,119, filed Mar. 5, 2004, entitled "Advanced Port-Based E911 Strategy for IP Telephony" and Ser. No. 10/607,414, filed Jun. 25, 2003, entitled "Universal Emergency Number ELIN Based on Network Address Ranges", each of which is incorporated herein by this reference. In one example, the host terminals are connected in the LAN 142 to a plurality of Ethernet switches. Each device has a corresponding Media Access Control or MAC address. The Ethernet switches are cabled to wall jacks in specific rooms or cubicles. The server maintains an auto or manual entry table with a mapping of terminal extension to MAC address and Ethernet switch and port to physical location (such as wall jack location), e.g., switch 12sw-a4 comprises port 7, which in turn corresponds to building A, floor 4, aisle C, cube 10. In another example, the terminal's IP address is used for object location. IP addresses are grouped into networks or sub-networks. As will be appreciated, a "subnet" is a common term used to describe a grouping of IP addresses. It is a common practice to assign a subnet of IP addresses to a relatively tight geographic region. For example, an IP subnet could be assigned to a given floor in an office building or one wing of a given floor. In yet another example, the extension of the terminal is used to provide object location information by mapping extension against physical location of the terminal. In many applications, the terminal having a designated extension is stationary. The administered location for the terminal corresponding to an extension can therefore be used to provide object location information.

The operation of the various computational modules will now be discussed with reference to FIGS. 4-5.

Figure 4:
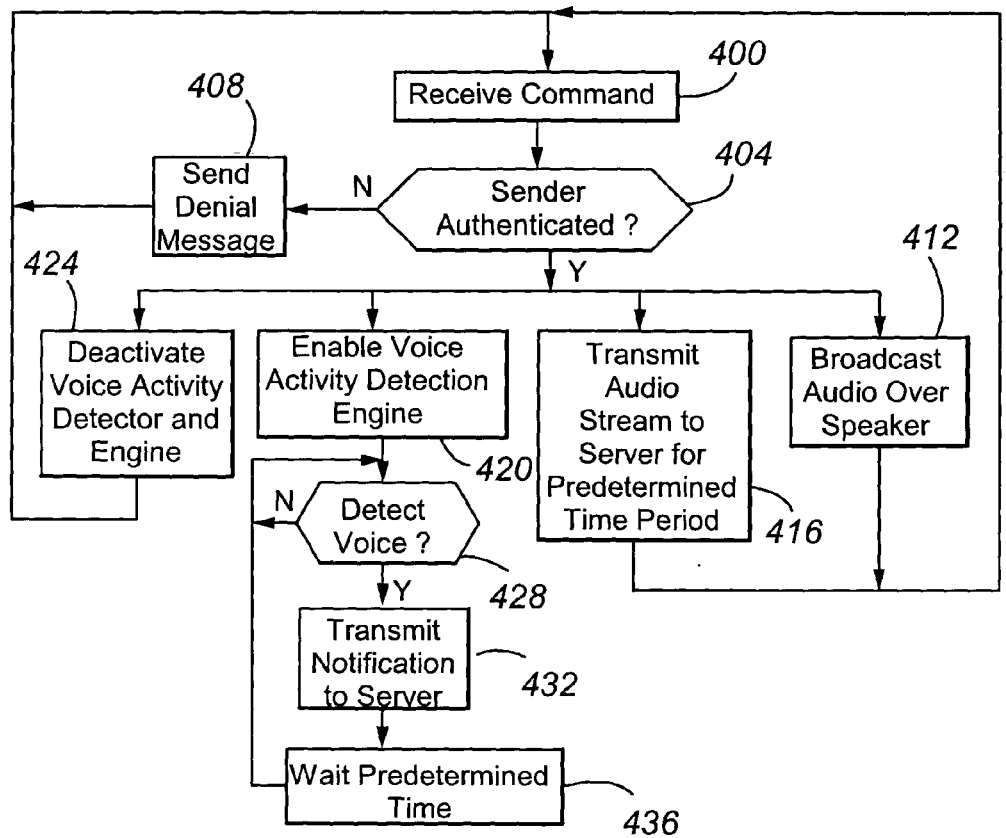
FIG. 4 is an operational flow chart of the various modules in the terminal according to an embodiment of the present invention.
Figure 5:
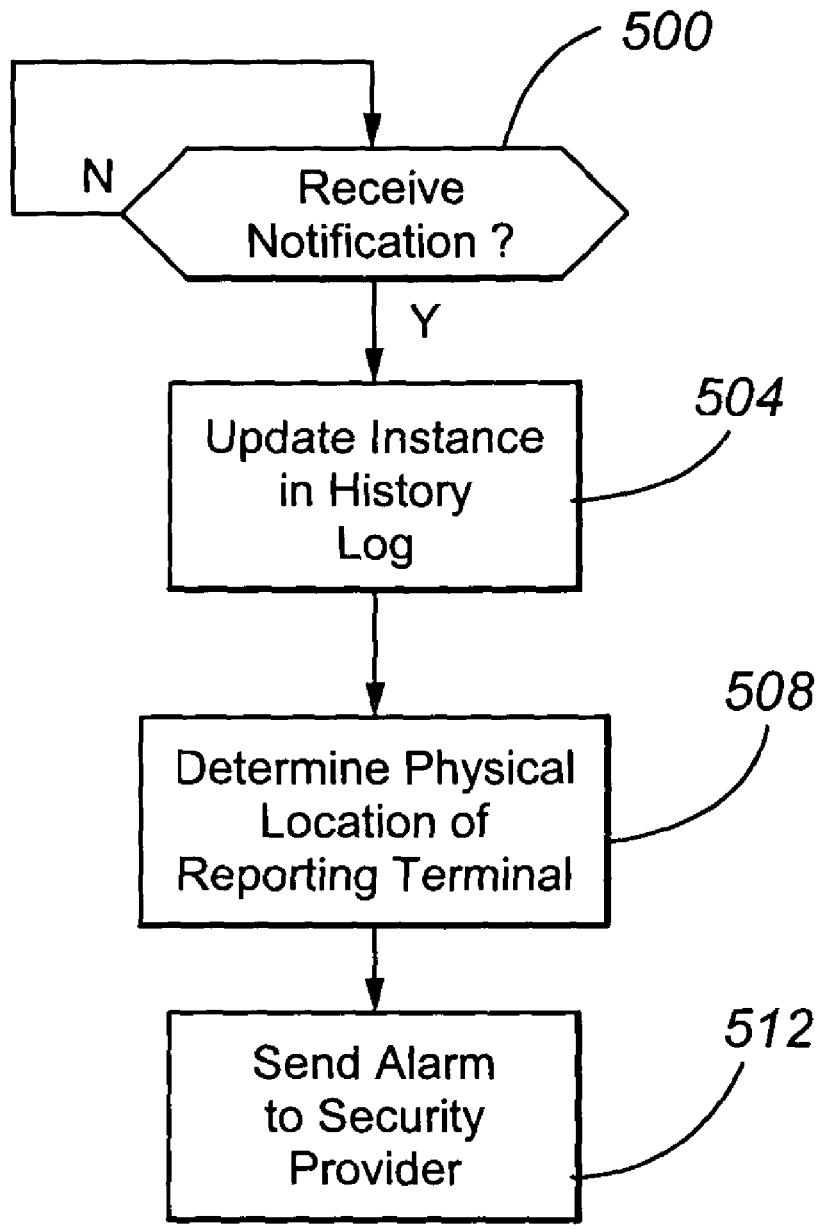
FIG. 5 is an operational flow chart of the alarm agent in the multimedia server.

With reference to FIG. 4, in step 400 the voice activity detector 220 in the terminal 200 receives a command from the server 110. The command is typically one of enable or disable voice activity detection, transmit an audio stream received by the microphone 208 over a defined time period to the server 110, and broadcast an audio message, such as an alarm or a request for identification, over the speaker 212.

In decision diamond 404, the terminal, before implementing the command, determines if the sender has been authenticated by the authentication agent 250. This prevents a hacker or intruder from sending a false command to the terminal, such as a false disablement command. If the sender is not properly authenticated, the detector 220, in step 408, sends a denial message indicating that proper authentication was not received and refuses to execute the command. If successfully authenticated, the detector 220 proceeds to one of steps 412, 416, 420, and 424 depending on the precise command received.

In step 420, the command is to enable the voice activity detection engine 216 and monitor its output for detected nonbackground audio signals, particularly voice. The detector 220 periodically, in decision diamond 428, determines if a nonbackground signal is detected by the engine 216. If not, the detector 220 returns to and repeats decision diamond 428. If so, the detector 220, in step 432, transmits a notification to the server 110 (for a packet-switched notification) or switch 130 (for a circuit-switched notification) indicating that a nonbackground signal has been detected and optionally providing the physical location of the terminal. Alternatively, the server 110 may determine the physical location of the terminal. After sending the notification, the detector 220 waits a predetermined time for a response, which may be an acknowledgment or further command, and repeats decision diamond 428.

In step 416, the command is to transmit an audio stream to the server for a predetermined time period and/or until a nonbackground signal is no longer detected. This transmission is effected by the audio sending agent 224. This transmission may be done, for example, using audio streaming techniques. To conserve bandwidth and memory space, the transmitted audio may include only detected nonbackground signals and/or may be compressed. At any one time, only one terminal could be enabled to transmit the audio stream to the server. The server could, in this manner, receive, at different times, the audio stream from different terminals, depending on which was receiving the strongest audio signals from the intruders. The server may save audio streams in a database 114, perform speech detection on the audio stream, and/or provide the audio stream or a text version thereof to the security provider 174.

In step 412, the command is to broadcast an audio message over the speaker 212. This command is effected by the audio broadcasting agent 228. As noted, the message may be an alarm, a request for intruder identification, a notification that police and/or security personnel has been dispatched, and the like. The server pushes the message to be broadcast to the selected terminal. In response, the potential intruder could be required to speak his or her name and/or type an employee authorization code into a nearby terminal.

Finally, in step 424, the command is to deactivate the voice activity detection engine and terminate intruder monitoring.

After commands 412, 416, or 424 have been completed, the detector returns to step 400 to await a next command.

The operation of the alarm agent 170 will now be discussed with reference to FIG. 5.

In decision diamond 500, the agent 170 determines whether a notification has been received from a terminal. If not, decision diamond 500 is repeated at a predetermined time interval. If so, the agent 170 proceeds to step 504.

In step 504, the agent 170 updates the history log to reflect an instance of receipt of a notification. Each entry in the history log typically includes an identifier of the reporting terminal (e.g., telephone number, IP address, or other electronic address), the time and date that the notification was received, and optionally the physical location of the terminal.

In step 508, the agent 170 determines the physical location of the reporting terminal. This may be done by any of the techniques noted above. Additionally, in a business having a static terminal/physical location association a lookup table may be used that indexes terminal identifier against physical location.

In step 512, the agent 170 applies predetermined policies or rules to determine whether an alarm notification needs to be sent to the security provider 174. This may include querying adjacent terminals (within audio detection range of the reporting terminal) to determine whether or not they too detect voice. This configuration would lower the incidence of false alarms. If necessary, an alarm notification is sent to the security provider 174 using standard virtual private network secured IP tunneling techniques.

As will be appreciated, the agent 170, when voice activity detection is in effect, may periodically poll each of the terminals to determine whether the terminal has been disconnected or is otherwise nonoperational. This would prevent an intruder from disconnecting the adjacent terminals to avoid detection. If several adjacent terminals have been disconnected, an alarm notification could be provided to the security provider 174.

A number of variations and modifications of the invention can be used. It would be possible to provide for some features of the invention without providing others.

For example in one alternative embodiment, one or more of the modules in each of the terminals is relocated in the server.

In another alternative embodiment, one or more of the modules in the terminal/server is embodied in dedicated hardware, such as an Application Specific Integrated Circuit or ASIC or other type of logic circuit, in general-purpose hardware such as a digital-signal processor, in software stored in the memory 214 of the terminal (as shown), some other computer-readable medium and executed on processor 250, or as a combination of hardware and software.

In yet another alternative embodiment, the present invention is used to detect the presence of a user at his or her associated terminal. This may be used, for example, to determine a user's presence at a selected time.

In yet another embodiment, the present invention is used to eavesdrop on an employee to determine compliance with an employer's policies/employment requirements.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    providing a plurality of voice communications terminals within a premises serviced by a contact processing switch or server, each of the voice communications terminals having a corresponding internal telephone extension, wherein the voice communications terminals are operable to receive incoming telephone calls to the internal telephone extensions and send outgoing telephone calls to the contact processing switch or server, wherein the contact processing switch or server directs incoming telephone calls to and receives outgoing telephone calls from the internal telephone extensions;
    receiving, by a first selected voice communications terminal, an audio stream through a microphone when the first selected voice communications terminal is not engaged in a telephone call;
    determining, by the first selected voice communications terminal, that the audio stream comprises nonbackground audio signals;
    in response to determining that the audio stream comprises the nonbackground audio signals, at least one of notifying, by the first selected voice communications terminal, the contact processing switch or server and providing, by the first selected voice communications terminal, at least a portion of the audio stream to the contact processing switch or server;
    receiving, by a second selected voice communications terminal, the audio stream through a microphone when the second selected voice communications terminal is not engaged in a telephone call;
    determining, by the second selected voice communications terminal, that the audio stream comprises nonbackground audio signals;
    in response to determining, by the second selected voice communications terminal, that the audio stream comprises the nonbackground audio signals, at least one of notifying, by the second selected voice communications terminal, the contact processing switch or server and providing, by the second selected voice communications terminal, at least a portion of the audio stream to the contact processing switch or server;
    determining, by the contact processing switch or server, an approximate physical location of a source for the audio stream based on a first physical location of the first selected voice communications terminal and a second physical location of the second selected voice communications terminal;
    forwarding, by the first selected voice communications terminal, at least a portion of the audio stream to the contact processing switch or server.

2. The method of claim 1, wherein, in the determining step, the first selected voice communications terminal performs voice activity detection on the audio stream, wherein a voice activity detector determines whether an audio stream comprises nonbackground signals by identifying audio signals that, based on the audio signal frequency range or distribution, are unusual, relative to background audio signals received over a determined time interval or the background audio signals having a signal strength greater than a selected decibel level, wherein the first selected voice communications terminal is a telephone, wherein the contact processing switch or server includes a call controller, and further comprising:
    receiving, by the contact processing switch or server, the notification from the selected voice communications terminal; and
    transmitting, by the contact processing switch or server, an alarm notification to a security provider.

3. The method of claim 1, further comprising:
    receiving, by the first selected voice communications terminal, at least one of a text and audio message from the contact processing switch or server; and
    broadcasting, by the first selected voice communications terminal, the at least one of a text and audio message through a speaker.

4. The method of claim 3, further comprising:
    receiving, by the first selected voice communications server, a user identification signal in response to the broadcasting step; and
    when the user identification signal identifies a subscriber, the contact processing switch or server disregarding the notification; and
    at least one of when the user identification signal does not identify a subscriber and when the user identification signal is not received within a selected period of time, transmitting, by the contact processing switch or server, an alarm notification to a security provider.

5. The method of claim 1, further comprising:
    determining the first physical location of the first selected voice communications terminal transmitting the notification;
    determining the second physical location of the second selected voice communications terminal transmitting the notification; and
    providing the first and second physical locations to a security provider.

6. The method of claim 1, further comprising:
the first selected voice communications terminal receiving a command from the switch or server;
the first selected voice communications terminal authenticating the contact processing switch or server;
when the first selected voice communications terminal is unsuccessfully authenticated, not performing the command; and
when the first selected voice communications terminal is successfully authenticated, performing the command, wherein the command is at least one of enable voice activity detection and disable voice activity detection, wherein voice activity detection is activated, and wherein, when voice activity detection is activated, the following steps are performed:
pre-processing the audio stream to form a pre-processed audio stream;
extracting features from a selected segment of the pre-processed audio stream, the extracted features including one or more of energy, zero crossing, a frequency-domain shape of the pre-processed audio stream, a periodicity measure, or a statistic of speech and background noise; and
comparing extracted features with selected thresholds to determine whether non-background noise is present or absent from the selected segment of the pre-processed audio stream.

7. The method of claim 1, wherein, in a monitoring mode, the first selected voice communications terminal performs claim 1 and does not perform interpersonal voice communications, and, in a communications mode, the first selected voice communications terminal performs interpersonal voice communications and does not perform claim 1.

8. A non-transitory computer readable medium comprising processor-executable instructions to perform claim 1 and wherein the nonbackground signal is a voice signal.

9. A voice communications terminal, comprising:
a microphone operable to receive an audio stream when the voice communications terminal is not engaged in a telephone call;
a corresponding internal telephone extension in a premises serviced by a contact processing server, wherein the voice communications terminal is operable to receive incoming telephone calls to the internal telephone extension and send outgoing telephone calls to the contact processing switch or server, the contact processing server directing incoming telephone calls to and receiving outgoing telephone calls from the internal extension;
a voice activity detector operable to determine that the audio stream comprises nonbackground signals and in response to determining that the audio stream comprises the nonbackground signals, at least one of notify the contact processing server and provide at least a portion of the audio stream to the contact processing server;
wherein the voice communications terminal has a known physical location within a building, wherein the known physical location is unique to the voice communications terminal and different from a known physical location of one or more other voice communications terminals in the building, and wherein an approximate location of the audio stream is determined based on the known physical location of at least two voice communication terminals;
an audio broadcasting agent operable to receive at least one of a text and audio message from the contact processing server and broadcast the at least one of a text and audio message through a speaker.

10. The voice communications terminal of claim 9, wherein a detected nonbackground signal is a voice signal, wherein, in the determining operation, a voice activity detection engine performs voice activity detection on the audio stream, wherein the voice activity detector determines whether an audio stream comprises nonbackground signals by identifying audio signals that, based on audio signal frequency range or distribution, are unusual relative to background audio signals received over a determined time interval or audio signals having a signal strength greater than a selected decibel level, wherein the voice communications terminal is a telephone, wherein the contact processing server includes a call controller and an alarm agent, and wherein the alarm agent is operable to receive the notification from the voice communications terminal and transmit an alarm notification to a security provider.

11. The voice communications terminal of claim 9, further comprising: an audio sending agent operable to forward at least a portion of the audio stream to the contact processing server, wherein, in operation (a), the voice activity detector pre-processes the audio stream to form a pre-processed audio stream; extracts features from a selected segment of the pre-processed audio stream, the extracted features including one or more of energy, zero crossing, a frequency-domain shape of the pre-processed audio stream, a periodicity measure, or a statistic of speech and background noise; and compares extracted features with selected thresholds to determine whether non-background noise is present or absent from the selected segment of the pre-processed audio stream.

12. The voice communications terminal of claim 9, further comprising: an authentication agent operable to authenticate a command from the contact processing server.

13. The voice communications terminal of claim 9, wherein, in a monitoring mode, the voice communications terminal performs the operations of claim 9 but does not receive incoming calls or initiate outgoing calls, and, in a communications mode, the voice communications terminal does not perform the operations of claim 9 but receives incoming calls and initiates outgoing calls.

14. The voice communications terminal of claim 9, wherein the contact processing server determines the known physical location of the voice communications terminal by mapping a corresponding extension of the voice communications terminal to a corresponding electronic network address and mapping the corresponding network address to determine the known physical location.

15. A communications system, comprising:
two or more voice communications terminals, wherein each voice communications terminal has a corresponding known physical location within a building, each voice communications terminal comprising:
an input operable to receive an audio stream when the voice communications terminal is not engaged in a telephone call;
a corresponding internal telephone extension in a premises serviced by a communications server, wherein the voice communications terminals are operable to receive incoming telephone calls to the internal telephone extension and send outgoing telephone calls to the communications server;
a voice activity detector operable to determine that the audio stream comprises voice signals and in response to determining that the audio stream comprises voice signals, operable to at least one of notify the communications server and provide at least a portion of the audio stream to the communications server, wherein the voice activity detector is operable to determine whether an audio stream comprises nonbackground signals by identifying audio signals that, based on the audio signal frequency range or distribution, are unusual relative to background audio signals received over a determined time interval or the background audio signals having a signal strength greater than a selected decibel level, wherein the two or more voice communications terminals are telephones, and further operable to determine a physical location of one of the two or more voice communications terminals by mapping a corresponding extension of the one of the two or more voice communications terminals to a corresponding electronic network address and mapping the corresponding network address to determine the physical location; and the communications server in communication with the two or more voice communications terminals, the communications server operable to receive one or more notifications from one or more voice communications terminals, and operable to transmit an alarm notification to a security provider, the communications server comprising:

a call controller operable to direct incoming telephone calls to and receive outgoing telephone calls from the corresponding internal telephone extensions, operable to receive the notification from the voice communications terminals, and operable to transmit an alarm notification to a security provider.

16. The communication system of claim 15, wherein-the voice activity detector is operable to perform voice activity detection on the audio stream by pre-processing the audio stream to form a pre-processed audio stream; extracting features from a selected segment of the pre-processed audio stream, the extracted features including one or more of energy, zero crossing, a frequency-domain shape of the pre-processed audio stream, a periodicity measure, or a statistic of speech and background noise; and comparing extracted features with selected thresholds to determine whether non-background noise is present or absent from the selected segment of the pre-processed audio stream.

17. The communication system of claim 15, further comprising:

audio sending means for sending at least a portion of the audio stream to the communications server; and audio broadcasting means for receiving at least one of a text and audio message from the communications server and broadcasting the at least one of a text and audio message through a speaker.

18. The communication system of claim 15, further comprising: authentication means for authenticating a command from the communications server.

19. The communication system of claim 15, wherein, in a monitoring mode, the two or more voice communications terminals perform claim 15 but does not initiate outgoing calls or receive incoming calls, and, in a communications mode, the two or more voice communications terminals not perform claim 15 but initiates outgoing calls and receives incoming calls.

* * * * *

UNITED STATES PATENT AND TRADEMARK OFFICE
CERTIFICATE OF CORRECTION

| | | |
|---|---|---|
| PATENT NO. | : 8,107,625 B2 | |
| APPLICATION NO. | : 11/096334 | |
| DATED | : January 31, 2012 | |
| INVENTOR(S) | : Simon Daniel Boland, Jonathan R. Yee-Hang Choy and Paul Thomas McNamara | |

It is certified that error appears in the above-identified patent and that said Letters Patent is hereby corrected as shown below:

At Column 12, line 17, after the word "terminal;" please add --and-- therein.

At Column 13, line 62, after the word "terminals;" please add --and-- therein.

At Column 15, line 29, after the word "wherein" please delete the "-".

Signed and Sealed this
Sixth Day of November, 2012

David J. Kappos
*Director of the United States Patent and Trademark Office*